United States Patent [19]

Hudgin et al.

[11] Patent Number: 4,495,311

[45] Date of Patent: Jan. 22, 1985

[54] DEGRADABLE HYDROCARBON POLYMERS

[75] Inventors: Donald E. Hudgin, Princeton Junction; Thomas Zawadzki, Princeton, both of N.J.

[73] Assignee: Princeton Polymer Laboratories, Inc., Princeton, N.J.

[21] Appl. No.: 455,334

[22] Filed: Mar. 27, 1974

Related U.S. Application Data

[62] Division of Ser. No. 269,291, Jul. 6, 1972, Pat. No. 3,830,764.

[51] Int. Cl.³ ................................................ C08F 8/06
[52] U.S. Cl. ..................................... 523/126; 523/125
[58] Field of Search .............. 260/DIG. 43, 32.8 A, 260/45.75 R; 96/88, 99; 204/159.14; 523/126

[56] References Cited

U.S. PATENT DOCUMENTS

| | | | |
|---|---|---|---|
| 3,676,401 | 7/1972 | Henry | 260/63 |
| 3,721,560 | 3/1973 | Heugebaert et al. | 96/88 |
| 3,759,807 | 9/1973 | Osborn et al. | 204/159.23 |
| 3,797,690 | 3/1974 | Taylor et al. | 260/23 |
| 3,825,627 | 7/1974 | McGaugh | 260/DIG. 43 |
| 3,888,804 | 6/1975 | Swanholm et al. | 260/DIG. 43 |

FOREIGN PATENT DOCUMENTS

| | | |
|---|---|---|
| 770202 | 7/1971 | Belgium . |
| 2109773 | 5/1972 | France .................... 260/DIG. 43 |
| 46-38687 | 11/1971 | Japan . |
| 46-38688 | 11/1971 | Japan . |

OTHER PUBLICATIONS

Defensive Publication T 861015, Newland, published 4/8/69.
Chem. Abs. vol. 80, 1974, 27912n.

*Primary Examiner*—Paul R. Michl
*Attorney, Agent, or Firm*—Cushman, Darby & Cushman

[57] ABSTRACT

A degradable composition is made from a polymer of a mono olefin having 2—3 carbon atoms or styrene and an additive comprising (1) a derivative of an organic compound of a metal which has at least two valence states and (2) a benzoyl derivative of an organic compound or a triazole.

43 Claims, 1 Drawing Figure

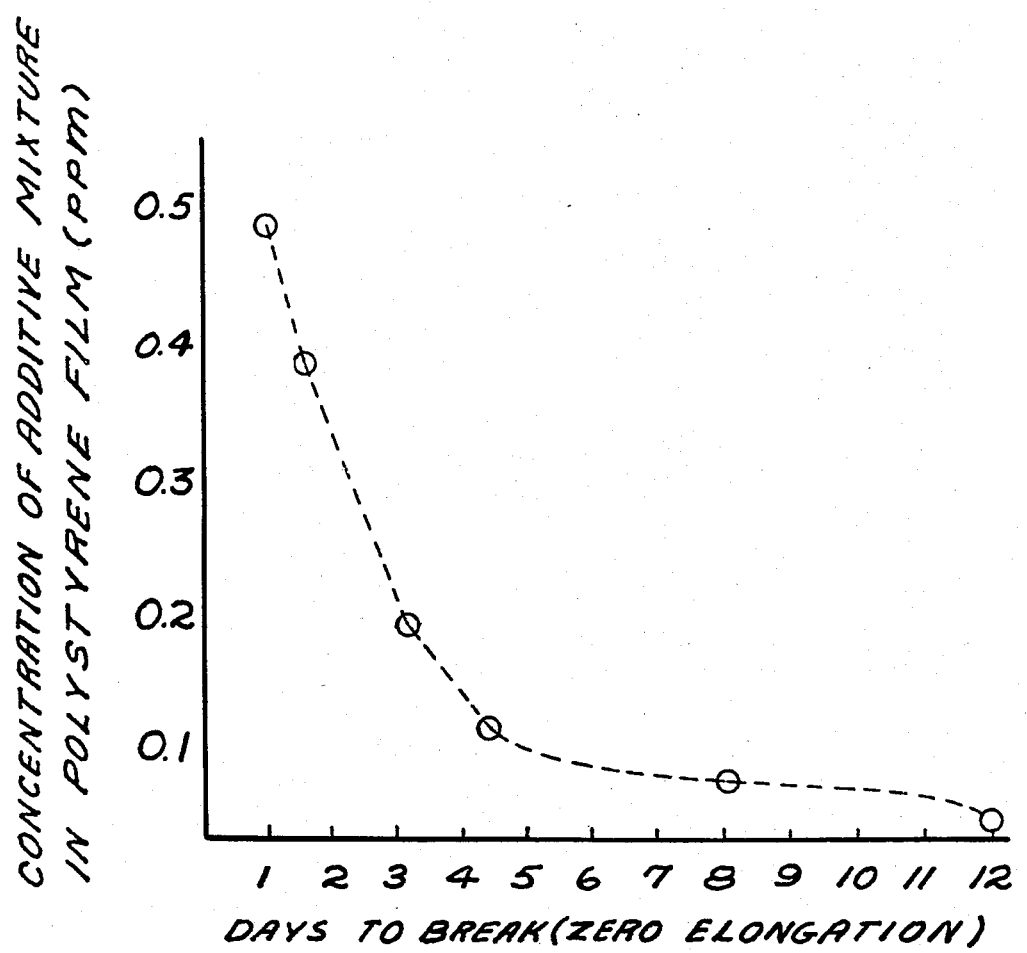

DEGRADABLE HYDROCARBON POLYMERS

This application is a division of application Ser. No. 269,291 filed July 6, 1972 and now U.S. Pat. No. 3,830,764.

This invention relates to a new polymer composition, based on polystyrene, polypropylene, polyethylene or ethylenepropylene copolymer and a novel additive system, which has predictable degradability when exposed to sunlight and air.

It is known that unstabilized polymers of propylene, styrene an ethylene will slowly degrade outdoors in presence of air and sunlight. Furthermore, it is known that certain additives will enhance this degradation, e.g. see Newland U.S. Pat. No. 3,592,792, Moore U.S. Pat. No. 3,320,695 and Newland 3,454,510. None of these additives, however, have proved to be satisfactory because the rate of degradation is still much too slow to cause the polymer to degrade within a reasonable length of time or the cost is too high to be economically feasible.

It is extremely important today to find an effective means of destroying plastic materials, which are used in packaging and agricultural mulch films. The pollution problem is becoming more severe as used plastic bottles, containers, wrapping film, sheet, etc. accumulate in garbage dumps, along shores, in rivers and other places. There is a great need for some sort of degrading system that will allow the plastic to have a useful life, after which the plastic will degrade into a material that can be handled easily.

This invention provides a new polymeric system capable of degrading to a crumbly friable mass in a matter of hours when exposed to sunlight and air. The rate of degradation can be controlled such that the degradation in sunlight and air can be made to happen at any time from a few hours to a few months. This can be done primarily by controlling the amount of additive system incorporated in the polymer and by the method of incorporation.

In the course of our study on additives to bring about degradation of polymers, two types of additives were combined. An unexpected synergism resulted giving amazingly fast degradation rates. Although the precise mechanism is not known, it appears highly probable that the two components of the additive system degrade the polymer by different mechanisms and that the breakdown products produced by the effect of one component becomes very vulnerable for attack by the second component.

As the polymer there is employed a polymer of a mono olefin having 2 to 3 carbon atoms, i.e. polyethylene, polypropylene, ethylene-propylene copolymer, (e.g. ethylene and propylene in a mole ratio of 5:95, 25:75, 50:50, 75:25 or 95:5) or polystyrene.

Any of the conventional polyethylenes can be used, i.e. low, medium or high density, e.g. density of 0.914 to 0.96, for example polyethylene having a density of 0.918 and a melt index of 1.7, polyethylene of density 0.945, polyethylene of density 0.925, or polypropylene having a birifringent melting point of about 168° C. and a reduced specific viscosity of 2.5 (measured on a 0.1% solution in decahydronaphthalene at 135° C.).

Typical examples of polyethylene, polypropylene, ethylenepropylene copolymers and polystyrene are set forth in the Encyclopedia of Polymer Science and Technology, Vol. 6, pages 275–386, Vol. 11, pages 597–619 and Vol. 13, pages 156–439, the entire disclosure of which are hereby incorporated by reference.

The additive system is composed of two components which we will call P and S for convenience.

P is a metallic derivative, derived from a transition metal capable of existing in two or more valence states. Examples of such metals are iron, cobalt, nickel, chromium, titanium, vanadium, manganese, copper, zirconium, tin and antimony. These metals may be in the form of metal salts or organic acids, such as cycloalkanoic acids, alkanoic acids, hydroxyalkanoic acids, haloalkanoic acids, alkenoic acids, aryl carboxylic acids, haloaryl carboxylic acids, e.g. formic acid, acetic acid, propionic acid, butyric acid, isobutyric acid, valeric acid, caproic acid, caprylic acid, trimethylacetic acid, pelargonic acid, decanoic acid, lauric acid, palmitic acid, stearic acid, eicosanic acid, oleic acid, linoleic acid, palmitoleic acid, acrylic acid, glycolic acid, lactic acid, citric acid, tartaric acid, oxalic acid, malonic acid, succinic acid, glutaric acid, adipic acid, azelaic acid, suberic acid, sebacic acid, tricarbyllic acid, fluoroacetic acid, chloroacetic acid, bromoacetic acid, dichloracetic acid, alpha-chloropropionic acid, betachloropropionic acid, saccharic acid, phenylacetic acid, benzoic acid, o-toluic acid, m-toluic acid, p-toluic acid, o-chlorobenzoic acid, m-bromobenzoic acid, terephthalic acid, phthalic acid, neodecanoic acid.

Examples of such salts include zirconium IV neodecanoate, zirconium II neodecanoate, zirconium IV oxalate, triglycolatozirconylic acid, zirconyl acetate, trilactozirconylic acid, zirconium IV stearate, zirconium IV octoate, zirconium IV neodecanoate, zirconium IV palmitate, zirconium IV oleate, stannous acetate, stannic acetate, stannous neodecanoate, stannous formate, stannous stearate, stannous oxalate, titanium oxalate, titanium IV neodecanoate, titanium IV stearate, stannous 2-ethylhexoate, nickelous acetate, nickelous formate, nickel II naphthenate, nickel II oleate, nickel II stearate, nickel II oxalate, nickel II formate, nickel II acetate, manganous acetate, manganous lactate, manganous oxalate, manganous tartrate, manganous benzoate, manganic acetate, ferrous acetate, ferric acetate, ferrous formate, ferric formate, ferrous lactate, ferric lactate, ferric malate, ferric oleate, ferrous oxalate, ferric oxalate, ferrous citrate, ferric citrate, ferric benzoate, antimony lactate, cupric lactate, cupric acetate, cupric oleate, cupric stearate, cupric naphthenate, cupric formate, cobalt II oleate, cobalt II stearate, cobalt II naphthenate, cupric oxalate, cupric tartrate, cobaltous tartrate, cobaltous linoleate, cobaltous palmitate, cobaltous oxalate, cobaltous acetate, cobaltic acetate, manganous naphthenate, iron naphthenate, manganous oleate, manganous linoleate, cobaltous linoleate, cobaltous octoate, manganous octoate, iron resinate, cobaltous resinate, manganous resinate, manganous neodecanoate, cobalt II neodecanoate, chromic oleate, stannic oleate, chromous acetate, chromic acetate, chromic stearate, chromic naphthenate, cupric adipate, litanium IV adipate, litanium IV phthalate and zirconium II neodecanoate.

There also can be formed complexes or chelates of the same metals with beta diketones such as 2,4-pentanedione (acetylacetone). Examples of such 2,4-pentanedione chelates include cobaltic pentanedione, ferrous pentanedione, ferric pentanedione, cupric pentanedione, titanium IV pentanedione, zirconium IV pentanedione, stannous pentanedione, nickel II pentanedione, chromium III pentanedione, manganous pentanedione.

S is a benzoyl derivative, preferably having a ketone group) or a benzotriazole derivative and is represented by the following structures:

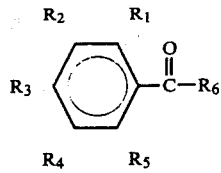

Where $R_1$ thru $R_5$ are H, halogen, alkyl, aryl, alkoxy, or aryloxy and $R_6$ may be alkyl, aralkyl, aryl, aroyl or pyridyl group (unsubstituted or having halogen, alkyl, aryl, alkoxy or aryloxy substituents) and

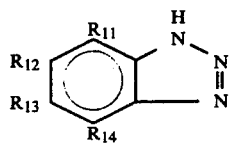

where $R_{11}$ thru $R_{14}$ may be H, halogen, alkyl, aryl, alkoxy, aralkyl, aroyl or aryloxy group. In $R_1$–$R_6$ and $R_{11}$–$R_{14}$ the alkyl groups can have 1 to 20 carbon atoms as can the alkoxy groups.

Examples of benzoyl compounds are benzophenone, 4-chlorobenzophenone, 4,4'-dimethoxybenzophenone, 4-fluorobenzophenone, 2-phenyl acetophenone, o-dibenzoyl benzene, 4-bromobenzophenone, 2,4,5-triethoxybenzophenone, 2,4,6-trimethoxy benzophenone, 4-methoxybenzophenone, 4-bromo-4'-chlorobenzophenone, 4-methylbenzophenone, 4,4'-dichlorobenzophenone, phenyl benzoate, benzil, acetophenone, 4'-chloroacetophenone, 4-chlorobutyrophenone, propiophenone, butyrophenone, 2-chloroacetophenone, 3-chloroacetophenone, 2,4,6-trichloroacetophenone, 2-methylbenzophenone, 3-ethylbenzophenone, 4-eicosanylbenzophenone, 4-octadecylbenzophenone, 4,4'-dioctadecylbenzophenone, 4-methoxybenzophenone, 4-ethoxybenzophenone, 4-octadecoxybenzophenone, 4-eicosanoxybenzophenone, 4-butoxybenzophenone, 4,4'-dioctadecoxybenzophenone, 4,3'-diethoxybenzophenone, benzyl phenyl ketone, 2-phenylbenzophenone, 4-phenylbenzophenone, 2-pyridyl phenyl ketone, pyridyl 4-chlorophenyl ketone, 2-chloro-4-methyl benzophenone, 3-benzoyl acetophenone, chloromethyl phenyl ketone, 4,4'-dimethylbenzophenone, 4,4'-diphenoxy benzophenone, 3-phenoxybenzophenone, phenyl 1-naphthyl ketone, 2'-acetonaphthone and 1'-acetonaphthone, phenyl 4-chlorobenzoate, phenyl 3-methylbenzoate, phenyl 4-dodecylbenzoate, phenyl 2-bromobenzoate, phenyl 3-fluorobenzoate, phenyl 2,4-dimethylbenzoate, phenyl 2-methyl-4-bromobenzoate, phenyl 2,4,5-trichlorobenzoate, phenyl 2-methoxybenzoate, phenyl 4-butoxybenzoate, phenyl 4-phenoxy-benzoate, methyl benzoate, ethyl benzoate, sec. butyl benzoate, octadecyl benzoate, eicosanyl benzoate, 4-chlorophenyl benzoate, 3-methylphenyl benzoate, 4-octylphenyl benzoate, 4-octadecylphenyl 4'-chlorobenzoate, 4-methoxyphenyl benzoate.

Examples of benzotriazole derivatives include benzotriazole, 5-chlorobenzotriazole, 5-bromobenzotriazole, 5-fluorobenzotriazole, 5-methylbenzotriazole, 5,7-dimethylbenzotriazole, 5-methoxybenzotriazole, 5-ethoxybenzotriazole, 5-octadecoxybenzotriazole, 5-octadecylbenzotriazole, 5-methyl-7-chlorobenzotriazole, 6-methylbenzotriazole, 5,6-dimethyl-8-chlorobenzotriazole, 5-benzylbenzotriazole, 7-phenoxybenzotriazole, 5-benzoyl benzotriazole.

Different methods of incorporation of the additives have been used effectively. In relatively thin plastic forms such as sheets and films the additive may be incorporated by merely dipping the plastic into a solution of the additive for a short time (e.g. a few seconds). For thicker plastic parts the additive can be incorporated effectively by normal processing techniques similar to the way other additives such as fillers are incorporated. This may be done on a roll mill, Banbury or extruder effectively. This latter method is preferred even for film and bottles because of uniformity and control of level of additive incorporated.

A special method that has many practical uses is a spray-on technique. This is useful on trash heaps where large quantities of used plastic articles have been accumulated. Rather than burning the plastic, it could be sprayed on easily and quickly with a solution of the additives in any volatile solvent and in a few days the useless plastic will have virtually disappeared. This can solve a major pollution problem.

Based on the total of the polymer and the additives the polymer is normally 90–99.999% and the additive is 0.001–10% usually being present in an amount of at least 0.01%. The P and S components of the additive can be present in equal amounts or either one can be excess, e.g. the additive can be 5 to 95% P and 95 to 5% S. Usually it is preferred to have the S component as the larger component. As is shown in example 1 as little as 0.1 ppm of additive is effective in disintegrating the polymer.

Unless otherwise indicated all parts and percentages are by weight.

The compositions of the present invention degrade very rapidly under a sunlamp but do not degrade rapidly under a regular fluorescent lamp. The compositions degrade under the influence of ultra violet light more rapidly than when the polymer is present with no additive or with only one additive.

Direct incorporation of the additives into the polymer by compounding on a roll mill or through a compounding extruder gives exact levels of the additives. In the dip technique the amount of each additive incorporated in the specimen (film or sheet) was determined by subjecting the specimen to analysis.

A 1½ mil polyethylene film was dipped for 10 seconds in the following solution at 60° C.:
50 g. CHCl$_3$
2 g. Zirconium II Neodecanoate
2 g. 4-Chlorobenzophenone After dipping the film was dried and analyzed. The following analyses were reported:
Zr—0.1%
Cl—0.045%

This corresponds to the following percentages of the original additives:
Zr Neodecanoate—0.43%
4-Chlorobenzophenone—0.085%

Thus only very small amounts are needed to be effective.

The controlability and predictability of the degradation of the polymer composition can be important. In the case of agricultural mulch films, exposure times to degradation must be precise so that new growing plants under the film can break through the film at the right time and thus assure strong healthy growth for the plants. In other areas, such as plastic bottles, the precision of the time for degradation may not be so critical. Still within limits some degree of accuracy is desirable. Our studies have allowed us to correlate light exposure time to degradation with amount and type of additives used. These studies have involved both sunlamp continuous exposure as well as outdoor sunlight exposure. In the sunlamp exposures the sunlamp was run 24 hours a day.

Samples of film (1 to 5 mils) and sheet (5-50 mils) were exposed by mounting a 1'×3' specimen in clamps on a holder so that it was suspended about ¼" above the surface. Each specimen thus mounted was placed on an 18" diameter horizontal round table, which was rotated at 33 rpm. Above the table at approximately 11 inches were 4 General Electric RS sunlamps. All of this equipment was housed in a metal box approximately 21" wide, 21" deep and 24" high. On opposite sides of the boxes at the turntable level were two openings 17" wide by 7" high. A fan of adjustable speed was used to blow through the openings to control the turntable temperature (37°±2° C.).

The light intensity was checked periodically to make sure that it remained fairly constant. When a drop in intensity was observed, new sunlamps were used to replace the used lamps.

The specimens were periodically tested by applying pressure on the suspended film or sheet. A specimen was considered to have failed when it broke on application of a slight pressure (zero elongation).

The sunlamp exposures were also correlated with tests in outdoor sunlight.

During the months from April through September an outdoor rack was used to expose samples of polymer film and sheet. These samples were mounted in holders similar to those used for sunlamp exposure as previously described. The rack faced South and was set at a 45° angle to the horizontal. Although outdoor sunlight intensity is variable depending on haze, clouds and rain, over a period of time reasonably good correlation was obtained as shown by typical examples in the following Table:

TABLE 1

| SAMPLE | TIME TO FAILURE (DAYS) | |
|---|---|---|
|  | SUN LAMPS | OUTDOOR |
| A | 2 | 9 |
| B | 2 | 7 |
| C | 2 | 7 |
| D | 4 | 10 |
| E | 3 | 9 |
| TOTAL | 13 | 42 |

The examples that follow are submitted to illustrate and not to limit this invention.

EXAMPLE 1

Commercial crystal grade polystyrene was compounded with the following ingredients on a roll mill to give mixtures with different levels of additive:

1 part of Zirconium Neodecanoate 5 parts of o-Dibenzoyl Benzene

For each level of additive mixture a compounded specimen was produced, pressed into a 2 mil film and exposed under 4 sunlamps on a revolving table. The film specimens were tested periodically. When a film broke under slight pressure (essentially zero elongation), this was taken as the time of failure.

The results are set forth in FIG. 1 of the drawings which is a graph showing concentration of total additive mixture in parts per million against days to break of the polystyrene film.

Polypropylene and polyvinyl chloride showed a similar effect; however, the effect varies somewhat from polymer to polymer as well as due to interaction between each polymer and a specific degrading system. But in general the pattern is the same as shown in FIG. 1.

EXAMPLE 2

Commercial polypropylene film specimens (1"×3"×0.0015") were dipped in the following chloroform solutions at 60° C. for 2 seconds, washed in fresh chloroform for 2 seconds and dried at room temperature.

Soln 1: Ferrous Pentanedione (2%)
Soln 2: 4-Methyl Benzophenone (2%)
Soln 3: A 1 to 5 mixture of Soln 1 and 2 (i.e. a mixture of 10 ml of solution 1 with 50 ml of solution 2 was used)

The treated polypropylene film specimens were mounted in film holders and exposed to 4 GE sunlamps on a revolving table. The film specimens were tested periodically. When a film broke under slight pressure, this was taken as the time of failure. For the described specimens the following results were obtained:

| Dip Soln | Hours to Failure |
|---|---|
| Soln 1 | 210 |
| Soln 2 | 160 |
| Soln 3 | Less than 16 |

Examples 3 and 4 also show the synergistic effect. Except for the additives, treatment of the film was the same as described in Example 2 using a chloroform solution of the additives.

| EXAMPLE | FILM USED | COMPONENTS | HOURS TO FAILURE |
|---|---|---|---|
| 3 | 1½ mil polystyrene | Titanium (+4) pentanedione | 200 hours |
|  |  | 4-Ethoxybenzophenone | 185 hours |
|  |  | 1-5 ratio of above components | 16 hours |
| 4 | 1½ mil polypropylene | Co Pentanedione | 114 hours |
|  |  | 4-Bromobenzophenone | 170 hours |
|  |  | 1-5 ratio of above components | <16 hours |

In the following examples the chloroform solution contained equal parts of components A and B:

| Example | 1.5 mil low density (about 0.916) Polyethylene Film 10 sec. dip in CHCl₃ Soln. COMPONENT A | COMPONENT B | TIME TO FAILURE (HRS. EXPOSURE) | | |
|---|---|---|---|---|---|
| | | | Component A Alone | Component B Alone | Mixture of A and B |
| 5 | Zirconium II Neodecanoate | 4-Chlorobenzophenone | 234 | 214 | 14 |
| 6 | Cobalt + 2 Neodecanoate | 4-Chlorobenzophenone | 311 | 214 | 118 |
| 7 | Ferric Pentanedione | 4-Chlorobenzophenone | 480 | 214 | 92 |
| 8 | Ti + 4 Pentanedione | 2-Phenylacetophenone | 94 | 433 | 44 |
| 9 | Ferrous Pentanedione | 2-Phenylacetophenone | 281 | 433 | 44 |
| 10 | Cobalt III Pentanedione | 4-Chlorobenzophenone | 311 | 214 | 85 |
| 11 | Cobalt III Pentanedione | 2-Phenylacetophenone | 311 | 236 | 42 |
| 12 | Zirconium + 2 Neodecanoate | 2-Phenylacetophenone | 234 | 236 | 109 |
| 13 | Ferrous Pentanedione | 4-Chlorobenzophenone | 281 | 214 | 21 |
| 14 | Titanium IV Pentanedione | 4-Chlorobenzophenone | 94 | 214 | 21 |
| 15 | Titanium IV Pentanedione | 2-Phenylacetophenone | 94 | 236 | 21 |
| 16 | Ferrous Pentanedione | Benzophenone | 281 | 236 | 42 |
| 17 | Ferrous Pentanedione | 4-Methylbenzophenone | 281 | 165 | 76 |
| 18 | Ferrous Pentanedione | 4-Bromobenzophenone | 281 | 236 | 47 |
| 19 | Ferrous Pentanedione | 4-Fluorobenzophenone | 281 | 207 | 76 |
| 20 | Ferrous Pentanedione | 4,4'-Dichlorobenzophenone | 281 | 165 | 47 |
| 21 | Ferrous Pentanedione | Phenyl Benzoate | 281 | 214 | 49 |
| 22 | Ferrous Pentanedione | 2,4,5-Triethoxybenzophenone | 281 | 424 | 243 |
| 23 | Ferrous Pentanedione | 2,4,6-Trimethoxybenzophenone | 281 | 424 | 214 |
| 24 | Ferrous Pentanedione | 4-Methoxybenzophenone | 281 | 207 | 95 |
| 25 | Ferrous Pentanedione | 5-Chlorobenzotriazole | 281 | 214 | 139 |
| 26 | Ferrous Pentanedione | Acetophenone | 281 | 214 | 91 |
| 27 | Ferric Napthenate | 4-Chlorobenzophenone | 706 | 214 | 49 |
| 28 | Ferrous Pentanedione | 4'-Chloroacetophenone | 281 | 214 | 91 |
| 29 | Ferrous Stearate | Benzophenone | 115 | 236 | 98 |
| 30 | Ferrous Octoate | 4-Chlorobenzophenone | 400 | 214 | 96 |
| 31 | Ferrous Neodecanoate | 4-Chlorobenzophenone | 141 | 214 | 96 |
| 32 | Ferrous Pentanedione | o-Dibenzoylbenzene | 281 | Not Determined | 95 |
| 33 | Ferrous Pentanedione | 2'-Acetonaphthone | 281 | " | 84 |
| 34 | Ferrous Pentanedione | 1'-Acetonaphthone | 281 | " | 133 |
| 35 | Ferrous Pentanedione | Benzil | 281 | " | 65 |
| 36 | Ferrous Pentanedione | Phenyl 2-Pyridyl Ketone | 281 | " | 36 |

What is claimed is:

1. A composition comprising a first component selected from the group consisting of chelates of a metal which is titanium or zirconium with a beta diketone, and a second component selected from the group consisting of (a) a benzoyl compound of the formula:

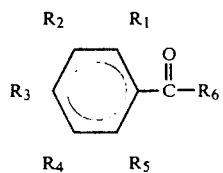

and (b) acetonaphthone where $R_1$, $R_2$, $R_3$, $R_4$ and $R_5$ are selected from the group consisting of hydrogen, halogen, alkyl, alkoxy, aryl, and aryloxy and $R_6$ is selected from the group consisting of alkyl, aralkyl, aryl, aroyl benzoylphenyl, and pyridyl groups and such groups substituted with a member of the group consisting of halogen, alkyl, aryl, alkoxy, and aryloxy, each of said components being present in an amount sufficient that the mixture thereof is more effective to decrease the time of degradation of a polymer of an olefin having having 2 to 3 carbon atoms than a corresponding amount of either member of the two component additive system by itself.

2. A composition according to claim 1 wherein the second component is (a).

3. A composition according to claim 2 wherein at least two of $R_1$, $R_2$, $R_3$, $R_4$ and $R_5$ are hydrogen and the rest are selected from the group consisting of hydrogen, lower alkyl, halogen, lower alkoxy, benzoyl and phenyl and $R_6$ is selected from the group consisting of lower alkyl, phenyl, halophenyl and phenoxy.

4. A composition according to claim 1 wherein the second component is a mono ketone and $R_6$ is lower alkyl, phenyl or halophenyl.

5. A composition according to claim 4 wherein each component is present in an amount of 5 to 95% of the total of the two components.

6. A composition according to claim 1 wherein the diketone is 2,4-pentanedione.

7. A polymeric composition having a controllable degradation rate in sunlight and air comprising (1) a polymer which is a member of the group consisting of polymer of an olefin having 2 to 3 carbon atoms and (2) a two component additive system, the first component of said additive being selected from the group consisting of chelates of a metal capable of existing in at least two valence states with a beta diketone, and the second component of the additive being selected from the group consisting of (a) a benzoyl compound of the formula:

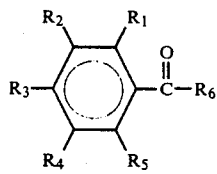

and (b) acetonaphthone where $R_1$, $R_2$, $R_3$, $R_4$ and $R_5$ are selected from the group consisting of hydrogen, halogen, alkyl, alkoxy, aryloxy, and aryl, and $R_6$ is selected from the group consisting of alkyl, aralkyl, aryl, aroyl benzoylphenyl, and pyridyl groups and such groups substituted with a substituent from the group consisting of halogen, alkyl, aryl, alkoxy, and aryloxy, said additive system being present in an amount effective to decrease the time of degradation of the polymer than a corresponding amount of either member of the two component additive system by itself.

8. A polymer composition according to claim 7 wherein the metal of the first component is selected from the group consisting of iron, cobalt, nickel, chromium, titanium, vanadium, manganese, copper, zirconium and tin.

9. A polymeric composition according to claim 8 wherein the second component of the additive system is (a).

10. A polymeric composition according to claim 9 wherein at least two of $R_1$, $R_2$, $R_3$, $R_4$ and $R_5$ are hydrogen and the rest are selected from the group consisting of hydrogen, lower alkyl, halogen, lower alkoxy, benzoyl and phenyl and $R_6$ is selected from the group consisting of lower alkyl, phenyl, halophenyl and phenoxy.

11. A composition according to claim 9 wherein the polymer is polyethylene, the two component additive system is present in an amount of 0.001–10% of the total of polymer and additive system and each component of the additive system is present in an amount of 5 to 95% of the additive system.

12. A composition according to claim 9 wherein the polymer is polypropylene, the two component additive system is present in an amount of 0.001–10% of the total of polymer and additive system and each component of the additive system is present in an amount of 5 to 95% of the additive system.

13. A polymer composition according to claim 7 wherein the metal of the first component is selected from the group consisting of iron, cobalt, nickel, chromium, titanium, vanadium, manganese, copper, zirconium and tin and the diketone is 2,4-pentanedione.

14. A polymeric composition according to claim 13 wherein at least two of $R_1$, $R_2$, $R_3$, $R_4$ and $R_5$ are hydrogen and the rest are selected from the group consisting of hydrogen, lower alkyl, halogen, lower alkoxy, benzoyl and phenyl and $R_6$ is selected from the group consisting of lower alkyl, phenyl, halophenyl and phenoxy.

15. A composition according to claim 7 wherein the two component additive system is present in an amount of at least 1 ppm of the polymer.

16. A composition according to claim 15 wherein each component of the additive system is present in an amount of 5 to 95% of the additive system.

17. A composition according to claim 13 wherein the metal is iron.

18. A composition according to claim 13 wherein the metal is cobalt.

19. A composition according to claim 13 wherein the metal is titanium.

20. A composition according to claim 13 wherein the metal is zirconium.

21. A composition according to claim 1 wherein the metal is titanium.

22. A composition according to claim 1 wherein the metal is zirconium.

23. A composition according to claim 13 wherein the metal is nickel.

24. A composition according to claim 13 wherein the metal is chromium.

25. A composition according to claim 13 wherein the metal is vanadium.

26. A composition according to claim 13 wherein the metal is tin.

27. A composition according to claim 7 wherein $R_6$ is pyridyl.

28. A composition according to claim 7 wherein the first and the second component is (a) and $R_6$ is pyridyl.

29. A composition according to claim 7 wherein carbon atoms and the metal of the first component is selected from the group consisting of iron, cobalt, nickel, titanium, vanadium, manganese, copper, zirconium and tin.

30. A composition according to claim 29 wherein the diketone is 2,4-pentanedione.

31. A composition according to claim 9 wherein the diketone is 2,4-pentanedione.

32. A composition according to claim 7 wherein the metal is titanium, zirconium or tin.

33. A composition according to claim 32 wherein the metal is titanium.

34. A composition according to claim 32 wherein the metal is zirconium.

35. A composition according to claim 32 wherein the metal is tin.

36. A polymeric composition having a controllable degradation rate in sunlight and air comprising a polymer of an olefin having 2 to 3 carbon atoms and a two component additive system, the first component of said additive being benzil and the second component of the additive being a chelate of a metal capable of existing in at least two valence states with a beta diketone, said additive system being present in an amount more effective to decrease the time of degradation of the polymer than a corresponding amount of either member of the two component additive system by itself.

37. A composition comprising a first component which is benzil and a second component which is a chelate of a metal capable of existing in at least two valence states with a beta diketone, each of said components being present in an amount sufficient that the mixture thereof is more effective to increase photodegradation of a polymer of an olefin having 2 to 3 carbon atoms than a corresponding amount of either member of the two component additive system by itself.

38. A composition according to claim 29 wherein the second component of the additive is (a) and $R_6$ is alkyl, aryl or benzoylphenyl.

39. A composition according to claim 38 wherein the metal is titanium or zirconium.

40. A composition according to claim 38 wherein the polymer is polyethylene.

41. A composition according to claim 38 wherein the polymer is polypropylene.

42. A composition comprising a first component selected from the group consisting of chelates of a metal capable of existing in at least two valence states with a beta diketone, and a second component selected from the group consisting of (a) a benzoyl compound of the formula:

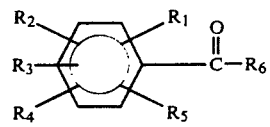

and (b) acetonaphthone where $R_1$, $R_2$, $R_3$, $R_4$, and $R_5$ are selected from the group consisting of hydrogen, halogen, alkyl, alkoxy, aryl, and aryloxy and $R_6$ is selected from the group consisting of a pyridyl group and such group substituted with a member of the group consisting of halogen, alkyl, aryl, alkoxy, and aryloxy, each of said components being present in an amount sufficient that the mixture thereof is more effective to decrease the time of degradation of a polymer of an olefin having 2 to 3 carbon atoms than a corresponding amount of either member of the two component additive system by itself.

43. A composition according to claim 42 where $R_6$ is pyridyl.

* * * * *